United States Patent
Kim et al.

(10) Patent No.: US 10,976,886 B2
(45) Date of Patent: Apr. 13, 2021

(54) DISPLAY APPARATUS AND DISPLAYING METHOD THEREOF

(71) Applicant: SAMSUNG ELECTRONICS CO., LTD., Suwon-si (KR)

(72) Inventors: Young-min Kim, Seoul (KR); Geon-woo Nam, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 79 days.

(21) Appl. No.: 15/869,947

(22) Filed: Jan. 12, 2018

(65) Prior Publication Data

US 2018/0373395 A1  Dec. 27, 2018

Related U.S. Application Data

(60) Provisional application No. 62/524,172, filed on Jun. 23, 2017.

(30) Foreign Application Priority Data

Sep. 28, 2017  (KR) .................. 10-2017-0126297

(51) Int. Cl.
*G06F 3/0481*  (2013.01)
*G01J 3/50*  (2006.01)
(Continued)

(52) U.S. Cl.
CPC ............ *G06F 3/0481* (2013.01); *F21V 9/08* (2013.01); *G01J 1/32* (2013.01); *G01J 3/506* (2013.01);
(Continued)

(58) Field of Classification Search
CPC .... G09G 3/30; G09G 3/3607; G09G 2320/02; G09G 2360/14; F21V 9/08; G01J 3/506; G06F 3/167
See application file for complete search history.

(56) References Cited

U.S. PATENT DOCUMENTS

| | | |
|---|---|---|
| 7,236,154 B1 | 6/2007 | Kerr et al. |
| 2002/0027652 A1* | 3/2002 | Paromtchik .......... G05D 1/0236 356/141.1 |

(Continued)

FOREIGN PATENT DOCUMENTS

| | | |
|---|---|---|
| EP | 2096625 A1 | 9/2009 |
| JP | 2008-79021 A | 4/2008 |

(Continued)

OTHER PUBLICATIONS

Communication dated Oct. 19, 2018, issued by the European Patent Office in counterpart European Application No. 18176016.6.
(Continued)

*Primary Examiner* — Shaheda A Abdin
(74) *Attorney, Agent, or Firm* — Sughrue Mion, PLLC

(57) ABSTRACT

A display apparatus is provided. The display apparatus includes a display that displays an image, a first sensor that detects an intensity of light incident from an area in front of the display, a second sensor that detects a color of light incident from a different direction than the light sensed by the first sensor, and a processor that corrects the intensity of the light sensed by the first sensor using the color of the light sensed by the second sensor and controls an operation of the display apparatus based on the corrected intensity of the light.

15 Claims, 11 Drawing Sheets

(51) Int. Cl.
G01J 5/60 (2006.01)
G09G 3/20 (2006.01)
G01J 1/32 (2006.01)
F21V 9/08 (2018.01)
G06F 3/03 (2006.01)
G06F 3/16 (2006.01)
G09G 3/30 (2006.01)
G09G 3/34 (2006.01)
G09G 3/36 (2006.01)

(52) U.S. Cl.
CPC .............. *G01J 5/60* (2013.01); *G06F 3/0308* (2013.01); *G06F 3/167* (2013.01); *G09G 3/2003* (2013.01); *G09G 3/30* (2013.01); *G09G 3/3406* (2013.01); *G09G 3/3607* (2013.01); *G09G 2320/02* (2013.01); *G09G 2320/0626* (2013.01); *G09G 2320/0666* (2013.01); *G09G 2320/0693* (2013.01); *G09G 2360/14* (2013.01); *G09G 2360/144* (2013.01)

(56) References Cited

U.S. PATENT DOCUMENTS

| | | | |
|---|---|---|---|
| 2004/0095402 A1* | 5/2004 | Nakano | G06F 3/0412 346/102 |
| 2005/0190205 A1* | 9/2005 | Koyama | G09G 3/3607 345/690 |
| 2009/0091718 A1* | 4/2009 | Obi | H04N 9/3105 355/30 |
| 2009/0184622 A1* | 7/2009 | Lee | C09K 11/665 313/485 |
| 2015/0219492 A1 | 8/2015 | Glover et al. | |
| 2016/0232828 A1 | 8/2016 | Jia et al. | |

FOREIGN PATENT DOCUMENTS

| | | | |
|---|---|---|---|
| JP | 2011-128232 A | | 6/2011 |
| JP | 2011128232 | * | 6/2011 |
| JP | 2014-116710 A | | 6/2014 |
| JP | 5725271 B2 | | 5/2015 |
| KR | 0177937 B1 | | 5/1999 |
| KR | 10-1676210 B1 | | 11/2016 |
| KR | 10-1740857 B1 | | 5/2017 |

OTHER PUBLICATIONS

Communication dated Feb. 6, 2019 issued by the European Patent Office in counterpart European Application No. 18176016.6.
Communication dated Oct. 29, 2019, issued by the European Patent Office in counterpart European Application No. 18 176 016.6.
Communication dated Jan. 26, 2021, issued by the European Patent Office in European Application No. 18176016.6.

* cited by examiner

FIG. 3A
FIG. 3B
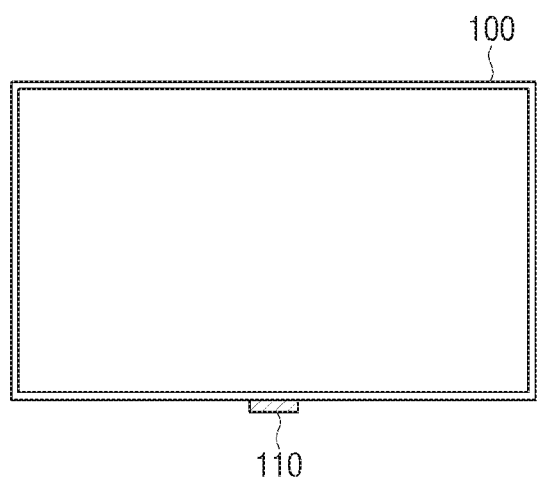
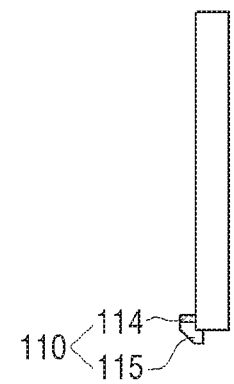

FIG. 6

| LIGHT SOURCE | BOTTOM COLOR | ILLUMINANCE (LUX) | FRONT SIDE COLOR SENSOR | | | | BOTTOM SIDE COLOR SENSOR | | | | LUX |
|---|---|---|---|---|---|---|---|---|---|---|---|
| | | | R | G | B | IR | R | G | B | W | |
| A | WHITE | 244.5 | 3913 | 4119 | 1042 | 5 | 6267 | 5503 | 2361 | 10223 | 239.9 |
| | | 182 | 2922 | 3078 | 782 | 4 | 4679 | 4107 | 1761 | 7640 | 176.2 |
| | | 126.2 | 2039 | 2149 | 551 | 4 | 3255 | 2856 | 1225 | 5327 | 120.4 |
| | | ... | ... | ... | ... | ... | ... | ... | ... | ... | ... |
| | RED | 244.5 | 1771 | 1395 | 248 | 4 | 1709 | 1089 | 509 | 2828 | 76.2 |
| | | 182 | 1322 | 1041 | 187 | 3 | 1275 | 811 | 381 | 2114 | 55.9 |
| | | 126.2 | 921 | 726 | 133 | 3 | 883 | 559 | 264 | 1471 | 38.1 |
| | | ... | ... | ... | ... | ... | ... | ... | ... | ... | ... |
| | BLACK | 244.5 | 165 | 165 | 49 | 3 | 179 | 140 | 73 | 460 | 7.9 |
| | | 182 | 125 | 125 | 39 | 3 | 131 | 102 | 55 | 344 | 5.9 |
| | | 126.2 | 90 | 90 | 30 | 3 | 88 | 67 | 37 | 240 | 4.2 |
| | | ... | ... | ... | ... | ... | ... | ... | ... | ... | ... |
| ... | ... | ... | ... | ... | ... | ... | ... | ... | ... | ... | ... |

FIG. 7

| LIGHT LOSS LATE ACCORDING TO BOTTOM COLOR REFLECTANCE RATIO(%) | |
|---|---|
| WHITE | 0 (REF) |
| RED | 55 |
| GREEN | 60 |
| BLUE | 55 |
| BLACK | 95 |
| ... | ... |

FIG. 8

| BOTTOM COLOR | JUDGMENT1 | JUDGMENT2 | JUDGMENT3 | JUDGMENT4 | ... |
|---|---|---|---|---|---|
| | x(IRf)/y(Gf) | a(IRf)/b(Wb) | (x'+y'+z')(Rb+Gb+Bb)/Wb | (x'+y'+z')(Rf+Gf+Bf)/(a'+b'+c')(Rb+Gb+Bb) | ... |
| WHITE | EXPERIENCE VALUE REGION #1 | | | | ... |
| RED | EXPERIENCE VALUE REGION #2 | | | | ... |
| BLACK | EXPERIENCE VALUE REGION #3 | | | | ... |
| ... | ... | | | | ... |

FIG. 9

| LUX CORRECTION COEFFICIENT PER COLOR | | | | |
|---|---|---|---|---|
| FACTOR | WHITE | RED | BLACK | ... |
| COEFF | a | b | c | ... |
| EXP | a" | b" | c" | ... |

DISPLAY APPARATUS AND DISPLAYING METHOD THEREOF

CROSS-REFERENCE TO RELATED APPLICATIONS

This application is based on and claims priority from U.S. Provisional Application No. 62/524,172, filed in the United States Patent and Trademark Office on Jun. 23, 2017, and Korean Patent Application No. 10-2017-0126297, filed in the Korean Intellectual Property Office on Sep. 28, 2017, and the disclosures of which are incorporated herein by reference in their entirety.

BACKGROUND

1. Field

Apparatuses and methods consistent with example embodiments relate to a display apparatus and a displaying method thereof, and more particularly, to a display apparatus capable of accurately identifying a brightness of an ambient environment by compensating for an optical loss of a sensor according to a disposition environment of the display apparatus, and a displaying method thereof.

2. Description of Related Art

A display apparatus is an apparatus which displays image signals in an externally visible manner. In order to reduce power consumption or provide a clearer screen, display apparatuses measure ambient brightness and display a screen with brightness corresponding to the measured brightness.

Ambient brightness measurement may be performed using an optical sensor such as an illumination sensor or a color sensor. In recent years, for anesthetic and design reasons, display apparatuses have been provided with an optical sensor positioned at the bottom of the display apparatuses.

In the case where a light sensor is provided at the bottom of a display apparatus, the optical sensor is affected not only by light directly radiated from ambient light sources, but also by the light reflected from the surface below the display apparatus, for example, the floor in the room where the display apparatus is mounted.

However, since the light reflected from the surface below the display apparatus differs depending on the color of the surface, display apparatuses of the related art have difficulty in using the light amount sensed by the light sensor to accurately adjust screen brightness.

SUMMARY

Example embodiments may address at least the above problems and/or disadvantages and other disadvantages not described above. Also, example embodiments are not required to overcome the disadvantages described above, and may not overcome any of the problems described above.

According to an aspect of an example embodiment, there is provided a display apparatus, including: a display; a first sensor configured to sense an intensity of light incident from an area in front of the display; a second sensor configured to sense a color of light incident from a different direction than the light sensed by the first sensor; and a processor configured to correct the intensity of the light sensed by the first sensor using the color of the light sensed by the second sensor and to control an operation of the display apparatus based on the corrected intensity of the light.

The processor may be further configured to determine a correction factor based on the color of the light sensed by the second sensor, and correct the intensity of the light sensed by the first sensor base on the determined correction factor.

The processor may be further configured to determine a color of a floor below a bottom surface of the display apparatus based on the color of the light sensed by the second sensor, and correct the intensity of the light sensed by the first sensor based on a correction factor corresponding to the determined color of the floor.

The processor may be further configured to adjust a brightness of the display based on the corrected intensity of the light.

The first sensor may be further configured to individually sense an infrared ray and a light of a predetermined color band, and the processor may be further configured to determine a type of a light source in a peripheral area of the display apparatus based on a ratio of the sensed infrared ray to the sensed light of the predetermined color band.

The processor may be further configured to adjust a color temperature of the image according to the determined type of the light source.

The first sensor may be an illuminance sensor or a color sensor, and the second sensor may be any one of a color sensor, a charge-coupled device (CCD) sensor, and a complementary metal-oxide semiconductor (CMOS) sensor.

The first sensor may be disposed on a rear surface of the display, and the display apparatus may further include a reflection member configured to reflect a light incident from the area in front of the display and image the reflected light on the first sensor.

The second sensor may be disposed to be adjacent to the first sensor on the rear surface of the display.

The reflection member may be a waveguide in which a cross-section of one end of a pipe is positioned on the first sensor and another end of the pipe is disposed toward a front of the display.

The second sensor may be further configured to sense a color of a floor below a bottom surface of the display apparatus.

According to an aspect of an example embodiment, there is provided a displaying method, including: detecting an intensity of light incident from an area in front of a display; detecting a color of light incident from a different direction than the light sensed from the area in front of the display; correcting the sensed intensity of the light using the sensed color of the light; and displaying an image based on the corrected intensity of the light.

The correcting the intensity of the light may include determining a correction factor by using the sensed color of the light and correcting the sensed intensity of the light by using the determined correction factor.

The correcting the intensity of the light may include determining a color of a floor below a bottom surface of the display by using the sensed color of the light and correcting the sensed intensity of the light by using a correction factor corresponding to the determined color of the floor.

The displaying the image may include displaying an image by adjusting a brightness of the display based on the corrected intensity of the light.

The detecting the intensity of the light may include individually detecting an infrared light and a light of a predetermined color band, and the displaying method may further include determining a type of a light source in a peripheral area of the display based on a ratio of the sensed infrared ray to the sensed light of the predetermined color band.

The displaying the image may include displaying an image by adjusting a color temperature of the image according to the determined type of the light source.

The detecting the color of the light may include detecting a color of a floor below a bottom surface of the display.

Accordingly to an aspect of an example embodiment, there is provided a non-transitory computer-readable recording medium including a program for executing a displaying method, wherein the displaying method including: detecting an intensity of light incident from an area in front of a display; detecting a color of light incident from a different direction than the light sensed from the area in front of the display; correcting the sensed intensity of the light using the sensed color of the light; and displaying an image based on the corrected intensity of the light.

According to an aspect of an example embodiment, there is provided a display apparatus, including: a display; a first sensor configured to sense an intensity of light incident from an area in front of a display surface of the display apparatus; a second sensor mounted on a rear surface of the display apparatus opposite to the display surface and configured to sense a color of light incident from a surface below a bottom surface of the display apparatus, the bottom surface being parallel to the display surface and the rear surface; and a processor configured to determine a correction factor based on the sensed color of the light, correct the sensed intensity of the light based on the determined correction factor, and change a display property of the display based on the corrected intensity of the light.

The display property of the display may be a brightness of the display.

The display property of the display may be a color temperature of the display.

The first sensor may be an illuminance sensor, and the second sensor is any one of a color sensor, a charge-coupled device (CCD) sensor, and a complementary metal-oxide semiconductor (CMOS) sensor.

BRIEF DESCRIPTION OF THE DRAWINGS

The above and/or other aspects will become more apparent and more readily appreciated from the following description of example embodiments, taken in conjunction with the accompanying drawings, in which:

FIGS. 3A and 3B are diagrams illustrating dispositions of a sensor, according to an example embodiment;

FIG. 6 is a diagram illustrating a difference between values of a plurality of sensors according to a disposition orientation;

FIG. 7 is a diagram illustrating an optical loss rate for each bottom color;

FIG. 8 is a diagram illustrating an example of a judgment table using values sensed by a plurality of sensors;

FIG. 9 is a diagram of an example of a correction factor for each color;

DETAILED DESCRIPTION

Example embodiments will be described in detail with reference to the accompanying drawings. However, the scope of the present disclosure is not limited to the example embodiments. Instead, the example embodiments may be variously modified. While describing example embodiments, if the specific description regarding a known technology obscures the gist of the disclosure, the specific description is omitted.

In example embodiments, relational terms such as first and second, and the like, may be used to distinguish one entity from another entity, without necessarily implying any actual relationship or order between such entities.

The terms used herein are solely intended to explain a specific example embodiment, and not to limit the scope of the present disclosure. It is to be understood that the singular forms "a," "an," and "the" include plural referents unless the context clearly dictates otherwise. The terms "include," "comprise," "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof. The expression, "at least one of a and b," should be understood as including only a, only b, or both a and b.

In the example embodiments disclosed herein, a term "module" or "unit" refers to an element that performs at least one function or operation. The "module" or "unit" may be realized as hardware, software, or combinations thereof. In addition, a plurality of "modules" or a plurality of "units" may be integrated into at least one module and may be realized as at least one processor except for "modules" or "units" that should be realized in a specific hardware.

Figure 1:
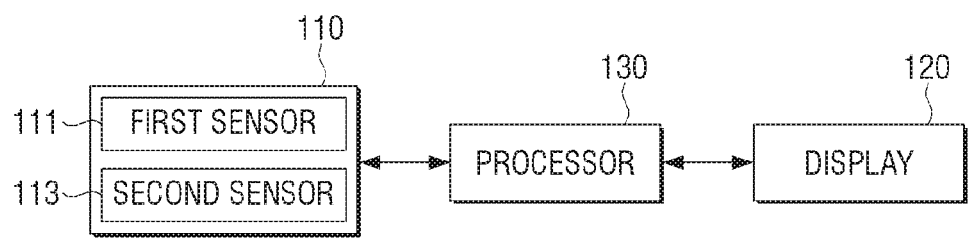
FIG. 1 is a block diagram illustrating a configuration of a display apparatus, according to an example embodiment.

FIG. 1 is a block diagram illustrating a configuration of a display apparatus, according to an example embodiment.

Referring to FIG. 1, the display apparatus 100 may include a sensor 110, a display 120, and a processor 130. The display apparatus 100 may be implemented by a TV, a monitor, or the like.

The sensor 110 may sense a lighting environment of a peripheral area of the display apparatus (e.g., an area in front of a display side of the display apparatus). For example, the sensor 110 may include an optical sensor, and may sense an illuminance, or brightness, of a peripheral area of the display and additionally sense an orientation of a light source, a type of a light source, and the like.

In a case in which the sensor 110 detects an illuminance, the sensor 110 may sense an intensity of light incident from an area in front of the display and sense a color from a bottom direction of the display apparatus. In addition, the sensor 110 may correct the sense sensed light intensity based on the sensed color and output the corrected light intensity value as a value of a light intensity of a peripheral area of the display apparatus. In this regard, a color from a bottom direction refers to a color of a surface (e.g., a floor) on which the display apparatus is placed or a color of a bottom surface below the display apparatus.

The operation of the sensor 110 may be implemented using one optical sensor, or may be implemented using a plurality of optical sensors. In this regard, an optical sensor is a sensor capable of sensing a brightness, or illuminance, of light, and may be an illuminance sensor, a color sensor, a charge-coupled device (CCD) sensor, a complementary metal-oxide semiconductor (CMOS) sensor, and the like.

When the sensor 110 is configured as one sensor, the sensor 110 may be provided with one color sensor and a driving unit capable of varying a sensing direction of the color sensor. For example, the driving unit may drive the sensor 110 such that a color sensor faces a bottom surface below the display apparatus at a time point when detection of a bottom color is necessary (a time point of initial installation of the display apparatus or a time point when it is sensed that the power terminal is mounted after being detached), and that, after the color of the bottom surface below the display apparatus is sensed, the color sensor faces the front direction again.

In addition, when the sensor 110 is configured as a plurality of sensors, the sensor 110 may include a plurality of sensors 111 and 113 which are disposed in different directions. In this regard, a first sensor 111 may be an illuminance sensor or color sensor which detects an intensity of light incident from an area in front of the display. In addition, a second sensor 113 may be a color sensor, CCD sensor, CMOS sensor and the like for detecting a color of light incident from the bottom surface below the display apparatus.

In this regard, the illuminance sensor may be a sensor which outputs one illuminance value or outputs illuminance values of two channels, and the color sensor may be a sensor to output a detection value per predetermined color band (R/G/B), and the color may further output a value corresponding to an average value (W) of RGB or an infrared ray (IR) value.

An example in which only two sensors 111 and 113 are used is described above. However, it is possible that three or more sensors are used. In addition, the types of sensors described above are merely examples, and it is possible to use features other than the sensor mentioned above so long as it can sense illuminance or color.

In the above example embodiment, the sensor 110 corrects a sensed light intensity based on a sensed floor color itself. In example embodiments, the sensor 110 may also perform only an operation of outputting the sensed color or the sensed light intensity, and the correction of light intensity may be carried out by an additional processor 130 which will be described later.

In the above example embodiment, it is assumed that the sensor 110 is disposed at the bottom of the display apparatus and thus, the light intensity is corrected using the bottom color. However, in a case in which the sensor 110 is disposed on the upper or side of the display apparatus, the sensor 110 may correct the sensed light intensity by using a ceiling color above the top of the display apparatus 100 or a wall color on the side of the display apparatus 100.

In the above example embodiment, the sensor 110 determines a color from a bottom direction itself. In example embodiments, the sensor 110 may determine a RGB color value from the bottom direction. For example, in a case in which a color of the bottom is white, the sensor 110 may determine that the bottom color has a value of RGB 256, 256, 256.

The sensors mentioned above may be embedded in a frame of the display apparatus so that they are not affected by the influence of light emitted from the display 120. For example, the sensors may be disposed as being embedded in a bottom end of the front surface, and may be disposed on a rear surface of the display apparatus 100. An example of a case where sensors are disposed on a rear surface of the display apparatus 100 will be described below with reference to FIGS. 3A and 3B.

The display 120 displays an image. Such display 120 may be implemented as various types of displays, such as a Liquid Crystal Display (LCD), an Organic Light Emitting Diodes (OLED) display, a Quantum dot light-emitting diodes (QLED) display, and the like. In a case in which the display 120 is configured as an LCD, the display 120 may include a driving circuit, a backlight unit, and the like which may be implemented in forms such as an a-si TFT, a low temperature poly silicon (LTPS) TFT, an organic TFT (OTFT), and the like. The display 120 may be realized as a touch screen as it is combined with a touch sensor.

In a case in which the display 120 is configured as an LCD, the display 120 includes a backlight. In this regard, the backlight is a point light source that includes a plurality of light sources, and supports local dimming.

In this case, the light source included in the backlight may be configured with a cold cathode fluorescent lamp (CCFL) or a light emitting diode (LED). Hereinafter, it will be illustrated and described that the backlight is configured with an LED and an LED driving circuit. However, at the time of implementation, the backlight may be realized as a feature other than the LED. The plurality of light sources of the backlight may be arranged in various forms, and diverse local dimming methods may be applied. For example, the backlight may be a direct type backlight in which a plurality of lights are disposed in a matrix form and uniformly arranged on the entire LED screen. In this regard, the backlight may be operated with full-array local dimming or direct local dimming. In this regard, the full-array local dimming is a dimming method which adjusts the brightness of each light source as a whole, evenly spreading the entire light source behind the LCD screen. In addition, the direct local dimming is similar to the full-array local dimming method, but it is a dimming method that adjusts the brightness of each light source with a less number of light sources.

In addition, the backlight may be a direct type backlight which disposes a plurality of light sources in the entire area or an edge type backlight in which a plurality of light sources are disposed only on the edges of the LCD. In this regard, the backlight may be operated with edge-lit local dimming. In the edge-lit local dimming, a plurality of light sources are disposed on the edge of the panel, and can be disposed only on the left/right side, only on the upper/lower side, or on the left/right/upper/lower sides.

The display 120 may perform dimming based on an intensity of light sensed by the sensor 110 and display an image with brightness that is adapted to an ambient brightness.

The processor 130 may include various processing circuitry and controls overall operations of the display apparatus 100. For example, the processor 130 determines the operation mode of the display apparatus 100. For example, when a TV display command or a content display command is received, the processor 130 may determine an operation mode that displays a normal image. In this regard, the operation mode is an operation state displaying a normal image.

In addition, in a case in which the display apparatus 100 is operated in the operation mode, when the user presses a power button, the processor 130 may switch the mode to a power off mode.

In addition, when a power command is received in the power off mode, the processor 130 may control each of features within the display apparatus 100 to operate in the normal mode.

In a case where the initial power is applied to the display apparatus 100 or the language is not set, the processor 130 may determine the initial operation mode. When the initial operation mode is determined, the processor 130 may control the sensor 110 to sense a color of the surface below the display apparatus. The initial operation mode may be performed in units of a predetermined time point (e.g., a day unit, a week unit).

When a sensed light intensity is received from the sensor 110, the processor 130 may correct the sensed light intensity by using a previously-received color. For example, the processor 130 may receive a color from the sensor 110 in the initial setting mode and store the received color, and may correct a value of light intensity received in real time or in predetermined time units (e.g., one second, five seconds, or the like) by using the color.

In more detail, the processor 130 may determine a correction factor by using the sensed color and correct an intensity of light sensed using the determined correction factor. For this purpose, a look-up table having a plurality of colors and a correction factor corresponding to each of the plurality of colors is stored in the display apparatus 100. In addition, the processor 130 may determine the sensed color as any one of the plurality of colors in the pre-stored look-up table, and may correct the sensed light intensity by using a correction factor corresponding to the determined color.

In the above example embodiment, a correction factor is determined based on color. In example embodiments, a correction factor may also be determined using a look-up table having a ratio range of RGB values output from a sensor for detecting a color in the bottom direction and a correction factor corresponding to the corresponding ratio range.

In this regard, the correction factor is a factor which is used in mathematical equations for generating a value of a signal output from a sensor and an actual illuminance value. If the mathematical equation is a linear function, the correction factor may be composed of one, and if the mathematical equation is a quadratic function, the correction factor may be composed of two. In the above example embodiment, two correction factors are used as in FIG. 9. However, in example embodiments, one correction factor may be used, or three or more correction factors may be used.

In addition, the processor 130 may determine a type of peripheral light sources of the display apparatus 100 based on a value measured by the sensor 110, and may adjust a color temperature of an image based on the determined light source type. For example, in a case in which the sensor 110 individually detects infrared light or light of a predetermined color band (e.g., green), the processor 130 may determine a type of peripheral light source of the display apparatus based on a ratio of the sensed infrared light to the sensed predetermined color band.

In addition, the processor 130 may perform image processing with respect to an image based on the sensed lighting environment (i.e., a direction and brightness of lighting). For example, the processor 130 may perform image processing that converts a color temperature of an image based on a color temperature sensed by the sensor 110.

In addition, the processor 130 may control the display 120 to display the image with brightness corresponding to the corrected light amount. For example, the processor 130 may control the display 120 to display an image with luminance, or brightness, corresponding to the corrected light intensity. For example, such brightness control may be performed to adjust a brightness value of image data itself, and may be performed to adjust a brightness of a backlight. In addition, the brightness control may be performed by using a method of using the above-mentioned image processing and dimming control in combination.

In addition, in a case in which an intensity of light sensed in real time or periodically is changed by more than a predetermined range, that is, the ambient environment changes (e.g., when the light is turned on or when the lighting is turned off), the processor 130 may control the display 120 to display an image with brightness corresponding to the changed light intensity.

Conversely, in a case in which an intensity of light sensed in real time or periodically is changed by less than a predetermined range, the processor 130 may determine that the ambient environment remains unchanged, and control the display 120 to display an image with luminance corresponding to the light intensity currently set.

In addition, the processor 130 may receive an installation environment of the display apparatus 100 from the user, and control the display apparatus 100 to perform the light intensity correction operation described above, in consideration of the installation environment. For example, because the display apparatus may be installed on a stand or on a wall mount (i.e., wall-mounted), a distance between the display apparatus and a floor surface may vary depending on the installation method.

Accordingly, in a case in which the display apparatus 100 is installed in a form other than a stand, the display apparatus 100 may further receive a distance between the display apparatus to the floor surface from the user and correct the received light intensity by using a correction factor based on the floor color and the distance.

As described above, the display apparatus 100 according to the present example embodiment may identify a color of the floor above which the display apparatus is positioned, and correct the sensed light intensity by using the identified color so that brightness of a peripheral area of the display apparatus may be more accurately measured. By using the accurately measured light intensity, the display apparatus 100 can adjust the luminance control to more precisely correspond the actualsensed light intensity.

Figure 2:
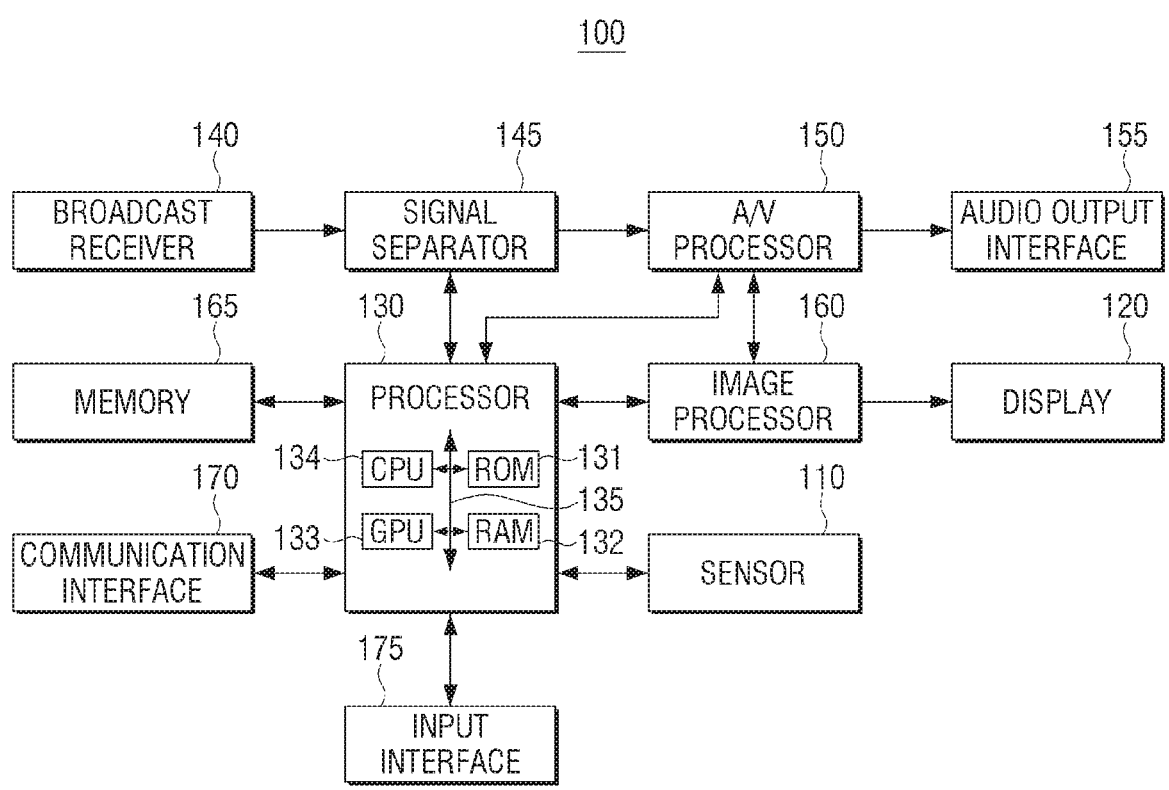
FIG. 2 is a block diagram illustrating a detailed structure of a display apparatus, according to an example embodiment.

Although a brief configuration of the display apparatus 100 is described above, the display apparatus 100 may further include features illustrated in FIG. 2. A detailed description of a configuration of the display apparatus 100 is provided below with reference to FIG. 2.

FIG. 2 is a block diagram illustrating a detailed structure of a display apparatus, according to an example embodiment.

Referring to FIG. 2, the display apparatus 100 according to an example embodiment may include a sensor 110, a display 120, a processor 130, a broadcast receiver 140, a signal separator 145, an audio/video (A/V) processor 150, an audio output interface 155, an image processor 160, a memory 165, a communicator 170, and a input interface 175.

The sensor 110 and the display 120 may be the same as the constitution illustrated in FIG. 1, which will not be redundantly explained below for the purpose of brevity.

The broadcast receiver 140 receives a broadcasting signal in a wired or wireless manner from a broadcasting station or a satellite and demodulates the received broadcasting signal. For example, the broadcast receiver 140 may receive a transmission stream via an antenna or a cable, demodulate it, and output a digital transmission stream signal.

The signal separator 145 divides a transmission stream signal provided from the broadcast receiver 140 into an image signal, an audio signal, and additional information signal. Further, the signal separator 145 transmits the image signal and the audio signal to the A/V processor 150.

The broadcast receiver 140 and the signal separator 145 are included in configurations when the display apparatus 100 is implemented as a TV and thus, when the display apparatus 100 is configured as a monitor, the broadcast receiver 140 and the signal separator 145 may be omitted.

The A/V processor 150 performs signal processing, such as video decoding, video scaling, and audio decoding, with respect to the video signal and the audio signal that are input from the broadcast receiver 140 and/or the memory 165. In the example embodiment described above, video decoding and video scaling are performed by the A/V processor 150. In example embodiments, the operation described above may be performed by the image processor 160. In addition, the A/V processor 150 outputs the image signal to the image processor 160 and outputs the audio signal to the audio output interface 155.

In the case of storing the received video and audio signals in the memory 165, the A/V processor 150 may compress the video and audio signals and store the compressed video and audio signals in the memory 165.

The audio output interface 155 converts the audio signal that is output from the A/V processor 150 into sound, and outputs the sound through a speaker or to an external device connected thereto through an external output terminal.

The image processor 160 may generate a graphical user interface (GUI) for the user. Such a GUI may be an on screen display (OSD), and the image processor 160 may be realized as a digital signal processor (DSP).

Further, the image processor 160 may add the generated GUI to an image that is output from the A/V processor 150, which will be described later. Accordingly, the display 120 displays various information provided from the display apparatus 100 and an image transmitted from the image processor 160.

In addition, the image processor 160 may extract brightness information corresponding to an image signal, and generate one dimming signal (when the display apparatus is operated by global dimming) or a plurality of dimming signals (when the display apparatus is operated by local dimming) that correspond to the extracted brightness information. In this regard, the image processor 160 may generate the dimming signal described above in consideration of a lighting environment that is sensed by the sensor 110. That is, the image processor 160 may generate a dimming signal to control the display apparatus to have a screen brightness according to the sensed ambient brightness. Such a dimming signal may be a pulse width modulated (PWM) signal.

The memory 165 may store image content. For example, the memory 165 may receive and store image content, in which video and audio are compressed, from the A/V processor 150, and may output the stored image content to the A/V processor 150 under the control of the processor 130.

In addition, the memory 165 stores a look-up table having a plurality of colors and a correction coefficient corresponding to each of the plurality of colors. In addition, the memory 165 may store a look-up table having a plurality of colors and a correction coefficient corresponding to each of a plurality of distances. The memory 165 may be implemented as a non-volatile memory (e.g., a hard disk, a solid state drive (SSD) and a flash memory), a volatile memory and the like.

The input interface 175 is implemented as a touch screen, touch pad, key button, keypad, and the like, to provide a user manipulation of the display apparatus 100. In the present example embodiment, an example in which a control command is received through the input interface 175 included in the display apparatus 100 is described, but the input interface 175 may receive a user manipulation from an external control device (e.g., a remote controller).

The input interface 175 may allow the user to select an installation environment (e.g., whether the display apparatus is installed on a stand or on a wall mount) of the display apparatus. When the display apparatus is installed on a wall mount, the input interface 175 may receive a distance between the display apparatus and a floor surface. In addition, the input interface 175 may also allow the user to directly input a color of the floor surface.

The communicator 170 is configured to communicate with various kinds of external devices using various communication methods. The communication interface 170 may include a Wi-Fi chip 331 and a Bluetooth chip 332. The processor 130 may perform the communication with various external devices by using the communicator 170. Specifically, the communication interface 170 may receive a control command from a control terminal device (e.g., a remote controller) capable of controlling the display apparatus 100.

In addition, although not illustrated in FIG. 2, according to example embodiments, the communication interface 170 may further include a USB port to which a USB connector is connected, various external input ports for connecting various external terminals such as a headset, a mouse, and a local area network (LAN), and a Digital Multimedia Broadcasting (DMB) chip that receives and processes a DMB signal.

The processor 130 may include various processing circuitry and controls overall operations of the display apparatus 100. Specifically, the processor 130 may control, in an operation mode, the image processor 160 and the display 120 so that an image according to a control command received through the input interface 175 is displayed.

The processor 130 may include read-only memory (ROM), random access memory (RAM), a graphic processing unit (GPU), a central processing unit (CPU), and a bus. The ROM 131, the RAM 132, the GPU 133 and the CPU 134 may be connected with each other through the bus 135.

The CPU 134 may access the memory 165 and perform booting using the O/S stored in the memory 165. The CPU 134 may also perform various operations by using various types of programs, contents, data, and the like stored in the memory 165. The operations of the CPU 134 have been described above in connection with the processor 130 in FIG. 1.

The ROM 131 may store a command set, and the like for system booting. If a turn-on command is input and the power is supplied, the CPU 134 copies the O/S stored in the memory 165 into the RAM 132 according to the command stored in the ROM 131, and boots the system by executing the O/S. When the booting is completed, the CPU 134 may copy the various programs stored in the memory 165 to the RAM 132, and perform various operations by implementing the programs copied to the RAM 132.

In detail, the GPU 133 may, when booting of the display apparatus 100 is completed, generate a screen that includes various objects such as an icon, an image, a text, and the like. The configuration of GPU described above may be configured as an separate feature such as the image processor 160, and may be realized as, for example, a System on Chip (SoC) that is combined with the CPU within the processor 130.

As described above, the display apparatus 100 according to the present example embodiment may identify a color of the floor on which the display apparatus is positioned, and correct the sensed light intensity by using the identified color so that brightness of a peripheral area of the display apparatus may be more accurately measured. By using the accurately measured light intensity, the display apparatus 100 can adjust the luminance control to more precisely correspond to the sensedactual light intensity.

Although FIGS. 1 and 2 illustrate and describe the case in which a color of a bottom surface below a display apparatus is identified using a second sensor and a light intensity of a first sensor is adjusted using the identified color, in example embodiments, it is also possible that a color of a bottom surface is directly input by the user without using an additional second sensor or an image generated by photographing a bottom surface from an additional external device is input through a communication interface.

FIGS. 3A and 3B are diagrams illustrating dispositions of a sensor, according to an example embodiment.

Referring to FIG. 3A, a sensor 110 is disposed at the lower end of the display apparatus when viewed from the front side of the display apparatus 100. For example, the sensor 110 may be partially exposed in the lower end direction. In this regard, the front side (display side) refers to a surface on which an image is displayed by the display apparatus 100, and a rear side is a side opposite to the surface displaying an image.

The sensor 110 may be configured as a substrate area 114 in which a plurality of sensors are disposed and a reflection member 115.

A plurality of sensors 111 and 113 are disposed in the substrate area 114. Specific disposition form of the plurality of sensors 111 and 113 are explained in detail below with reference to FIGS. 4 and 5.

In addition, the reflection member 115 reflects light incident from an area in front of the front side of the display apparatus and images the reflected light on the first sensor. The reflection member 115 may be configured as an optical waveguide, or may be configured as a reflection plate and a guide member.

In this regard, the waveguide is a transmission path for transmitting electric energy or signal along an axis. In the example embodiment, a light pipe or an optical waveguide may be used. The optical waveguide is a circuit or a line transmitting an optical signal, and may be an optical fiber or a thin film waveguide.

If the reflection member 115 is implemented as an optical waveguide, a cross-section of a conduit of an optical waveguide may be positioned in an image sensor, and the other cross-section of the conduit may be disposed in the front surface direction of the display apparatus. In addition, since a cross-section of the optical waveguide is smaller than a cross-section of the lens of the image sensor, a size exposed from the front side of the display apparatus 100 is smaller than that of the lens of existing image sensor.

FIG. 3A illustrates and describes the case in which the sensor 110 has a relatively large size in the display apparatus 100. However, this is merely for convenience for explanation, and it is difficult for the user to recognize the sensor because the width and size of the sensor in the 30 inch or larger display apparatus have a much smaller ratio than as shown in the drawing.

In addition, although FIG. 3B illustrates and describes the case in which a rear side of the display apparatus 100 is somewhat protruded, this is merely for convenience for explanation. It may be substantially less protruded than an area that engages with the bracket for fixing the display apparatus 100 to the wall or engages with a standing member for standing.

In addition, although FIGS. 3A and 3B illustrate and describe the case in which the sensor 110 is disposed at a lower end of the display apparatus, in example embodiments, the sensor 110 may be disposed at an upper end or left/right sides of the display apparatus. For example, in a case in which the sensor 110 is disposed at an upper end of the display apparatus, the sensor 110 may correct a sensed light intensity based on a ceiling color above the upper end of the display apparatus 100. In addition, in a case in which the sensor 110 is disposed on a side of the display apparatus, the sensor 110 may correct the sensed light intensity based on a wall color on the side of the display apparatus 100.

Figure 4:
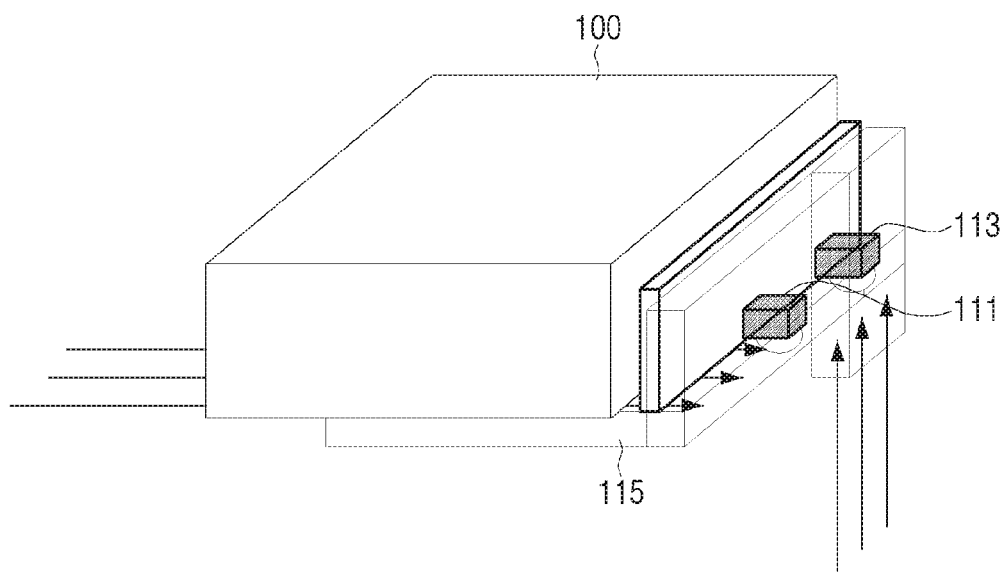
FIGS. 4 and 5 are diagrams illustrating a disposition structure of a case in which a sensor is configured using two sensors.
Figure 5:
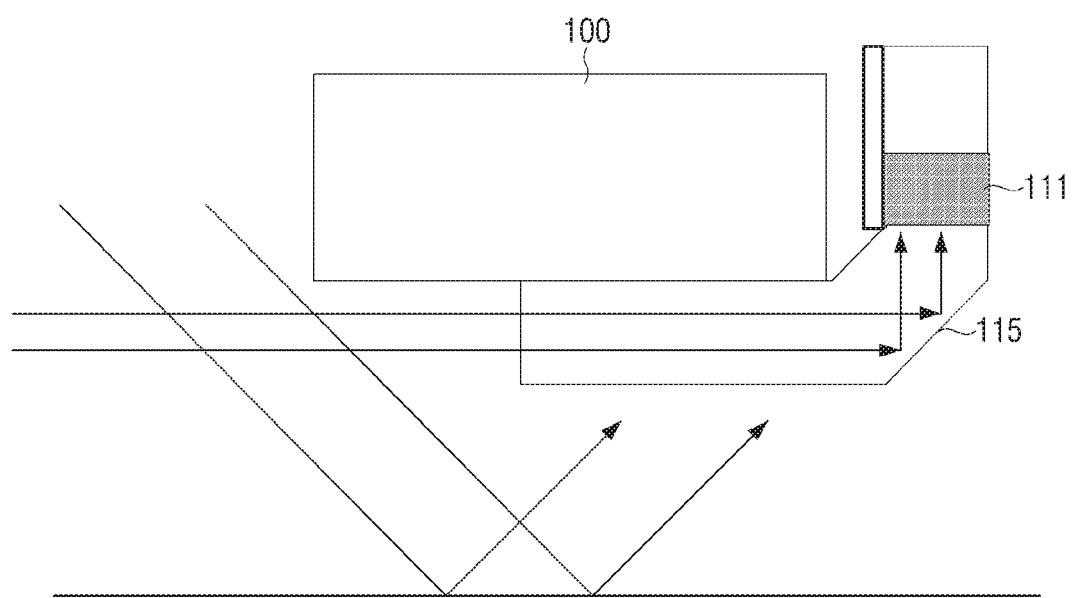

FIGS. 4 and 5 are diagrams illustrating a disposition structure of a case in which a sensor 110 is configured using two sensors.

Referring to FIGS. 4 and 5, a sensor 110 may include a first sensor 111, a second sensor 113, and a reflection member 115.

The first sensor 111 is disposed on the rear side of the display apparatus 100 and is disposed in a direction facing the bottom surface below the display apparatus 100. The first sensor 111 may be an illuminance sensor or a color sensor.

The second sensor 113 is disposed to be adjacent to the first sensor 111 on the rear side of the display apparatus 100 and is disposed in a direction facing the bottom surface below the display apparatus 100. The second sensor 113 may be a color sensor, a CCD sensor, a CMOS sensor, and the like.

The reflection member 115 reflects light incident from an area in front of the front side of the display apparatus and images the reflected light on the first sensor 111. The reflection member 115 may be configured as an optical waveguide, or may be configured as a reflection plate and a guide member.

Although FIGS. 4 and 5 illustrate and describe the case in which two sensors are disposed on the rear side of the display apparatus 100, in example embodiments, both sensors may be disposed at a lower end portion of the front side of the display apparatus 100. In example embodiments, the first sensor may be disposed on the front of the display 100, and the second sensor may be disposed on the rear side of the display apparatus 100.

Although FIGS. 4 and 5 illustrate and describe the case in which only two sensors are used, in example embodiments, three or more sensors may be used.

FIG. 6 is a diagram illustrating a difference between values of a plurality of sensors according to a disposition orientation. For example, FIG. 6 is a table of experimental output values of each sensor for each color and ambient illuminance of the bottom surface below the display apparatus 100 when both the first sensor and the second sensor are configured by color sensors. The illuminance (lux) at the end of the table is the illuminance value generated by using the value per color channel measured in the first color sensor (front side color sensor).

Referring to FIG. 6, it can be understood that the value of each channel measured by the first sensor and the illuminance value determined accordingly are changed according to the same ambient illuminance.

For example, when the floor color is white, it can be understood that the illuminance value (239.9 Lux) according to the measured value of the first sensor does not greatly differ from the actual ambient illuminance (244.5 Lux).

However, when the floor color is red, it can be understood that the measured illuminance value (76.2 Lux) is lower, despite the same illuminance environment. When the floor color is black, it can be understood that the measured illuminance value (7.9 Lux) is considerably lower.

The optical loss rate for each floor color according to the experiment values is shown in FIG. 7.

FIG. 7 is a diagram illustrating a light loss rate for each bottom color.

Referring to FIG. 7, it can be understood that when the bottom color is white, there is almost no light loss, but when the bottom color is red, green, and blue, the light loss is about 55 to 60%. Further, when the color is black, the light loss is 95%.

Accordingly, in a case in which a user installs a display apparatus on a floor having a color other than white, when an illuminance value outputted from an optical sensor is used as it is without any correction, even though the actual ambient light is in a bright state, the illuminance value outputted from the optical sensor is an illuminance value in a dark environment. Accordingly, in such display apparatuses of the related art, the measured illuminance value outputted from the illuminance sensor does not accurately correspond to the actual ambient illuminance.

In this respect, in the example embodiment, a floor color may be identified using an additional second sensor and compensation of illuminance sensor input from the first sensor is performed using the identified floor color, and thereby the influence of optical loss in the first sensor according to the floor color is minimized.

FIG. 8 is a diagram illustrating an example of a judgment table using values sensed by a plurality of sensors.

FIG. 8 illustrates values obtained by combining measured values per channel of two sensors 111 and 113 of FIG. 6.

A first combination (judgment 1) is a ratio of an infrared ray output (IRf) of a first sensor to a green output (Gf) of the first sensor. Such combination is to determine a type of a light source, and the ratio of the infrared rays differs depending on the type of the light source. Although the combination described above uses only values of the first sensor, in example embodiments, values of the second sensor may be used and a color output other than the green output (Gf) may also be used.

Accordingly, the display apparatus 100 may calculate a ratio of an infrared ray output value to a green output value from among a plurality of channel values outputted from the first sensor, and may identify a type of a light source corresponding to the calculated ratio. As illustrated in FIG. 8, such a ratio may differ depending on a floor color and thus, the display apparatus 100 may store a plurality of light sources and a ratio value corresponding to each of the plurality of floor colors in a look-up table.

A second combination (judgment 2) is a ratio of an infrared ray output (IRf) of a first sensor to a white output (Wb) of a second sensor. Such combination is to determine an orientation of a light source, and is based on the fact that there is a difference in the brightness value measured by the second sensor when the sensor is disposed on the ceiling or on the front surface.

A third combination is a combination of four output values Rb, Bb, Gb and Wb of the second sensor, which is to determine a color of a floor surface. It can be understood that the corresponding values have different ranges for each floor surface color regardless of a brightness of an ambient illuminance.

A fourth combination is a combination of three output values Rf, Bf and Gf of the first sensor and output values of the second sensor Rb, Bb and Gb, which is to determine a color of a floor surface as well. It can be understood that the corresponding values have different ranges for each floor surface color regardless of a brightness of an ambient illuminance. In the example embodiment described above, the color of the floor surface is determined by only values of the second sensor; however, a color of a floor surface may be determined using both values of the first sensor and the second sensor.

In example embodiments, it is possible to determine the color by using two or more combinations without determining the color by only the third combination or the fourth combination.

The four combinations described above are merely examples, and a combination other than the aforementioned four combinations may be used to determine a type and orientation of the light source and a floor color described above, and may also be used to determine a condition other than the type and orientation of the light source and the floor color.

FIG. 9 is a diagram of an example of a correction factor for each color.

Referring to FIG. 9, a memory 165 stores a plurality of colors and a correction factor for each of the plurality of colors. Although the example illustrated in FIG. 9 describes three correction factors with respect to three colors, in example embodiments, correction factors for more colors may be stored.

In addition, the correction factors described above are values in a case in which the display apparatus 100 is installed on a stand. That is, when the display apparatus is installed on a stand, a distance between a sensor and a floor is determined according to a product size.

In this respect, if the display apparatus 100 is installed on a wall mount instead of a stand, the memory 165 may store a distance between the display apparatus and a floor surface and a correction factor for each color. In this regard, the processor 130 may receive a distance value from a user, or may determine a correction factor by a distance value measured by an additional distance measurement sensor.

Figure 10:
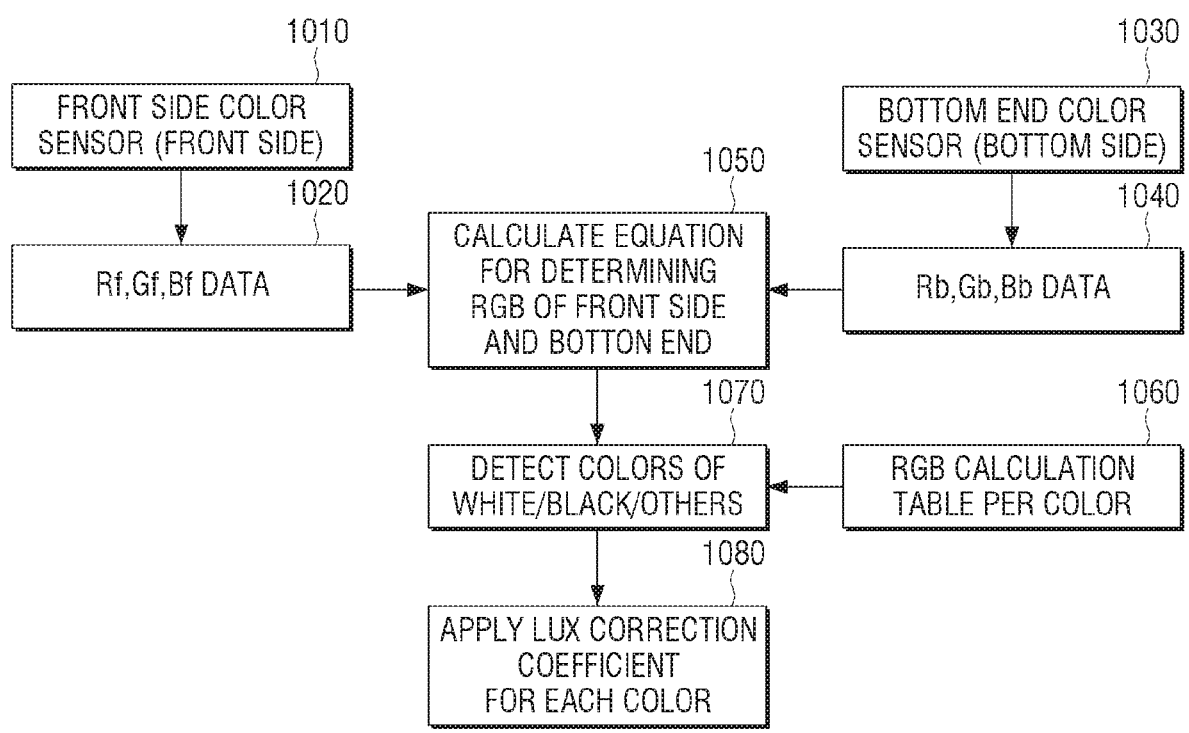
FIG. 10 is a diagram of a method of determining a correction coefficient.

FIG. 10 is a diagram of a method of determining a correction coefficient.

Referring to FIG. 10, a first sensor may sense light, 1010, and may output a sensing value per frequency band of the sensed light as a plurality of output values, 1020.

In addition, a second sensor may also sense light, 1030, and may output a sensing value per frequency band of the sensed light as a plurality of output values, 1040.

A processor 130 may receive output values of the first sensor and the second sensor, perform a calculation to combine each of the output values as shown in FIG. 8, 1060, and determine a floor color accordingly, 1070. In addition, not only the floor color, but also a type and orientation of the light source may be determined.

In addition, the processor 130 may read a correction factor corresponding to the determined floor color from the memory 165, 1060, and may correct a value sensed by the first sensor by using the read correction factor, 1080. In addition, image processing (e.g., color temperature adjustment) with respect to an image may be performed in consideration of a type and orientation of the light source sensed in the process described above.

Figure 11:
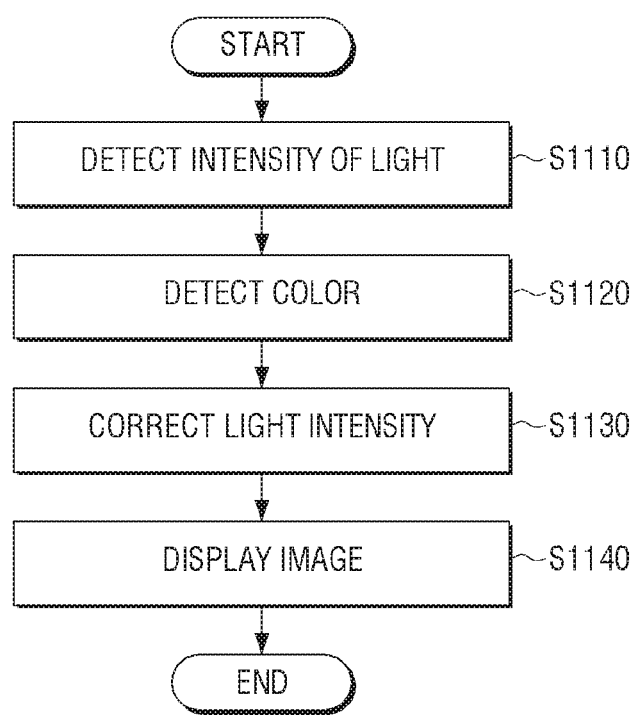
FIG. 11 is a flowchart illustrating a displaying method, according to an example embodiment.

FIG. 11 is a flowchart illustrating a displaying method, according to an example embodiment.

First, an intensity of light incident from an area in front of a display apparatus is sensed, at operation S1110. For example, an intensity of light incident from the area in front of the display may be sensed using a color sensor or an illuminance sensor. In this regard, when a color sensor is used, an infrared ray light and light of a predetermined color band may be individually sensed.

In addition, a color of a bottom surface below the display apparatus is sensed, at operation S1120. For example, the color of the bottom surface below the display apparatus may be sensed using a color sensor, a CCD sensor, a CMOS sensor, and the like.

In addition, a sensed light intensity is corrected using the sensed color, at operation S1130. For example, a correction factor may be determined using the sensed color and the sensed intensity of light may be corrected using the determined correction factor. In more detail, a floor color may be determined using the sensed color and a sensed intensity of light may be corrected using a correction factor corresponding to the determined floor color.

In addition, an image is displayed based on the corrected intensity of light, at operation S1140. For example, the image may be displayed by adjusting a brightness of a display based on the corrected intensity of light. When a color sensor is used as a first sensor, an image may be displayed by determining a type of light source in a peripheral area of the display apparatus based on a ratio of the sensed infrared ray and the sensed predetermined color band and adjusting a color temperature of the image according to the determined light source type.

As described above, the display method according to the present example embodiment may identify a color of the floor on which the display apparatus 100 is positioned, and correct the sensed light intensity by using the identified color so that brightness of a peripheral area of the display apparatus may be more accurately measured. By using the accurately measured light intensity, the display apparatus 100 can adjust the luminance control to more precisely correspond to the sensedactual light intensity. The method of controlling a display apparatus of FIG. 11 may be performed, for example, in a display apparatus having the configuration of FIG. 1 or FIG. 2, and may also be performed in a display apparatus having other configurations.

The above-described display method according to the example embodiment described above may be implemented in a program and provided to display apparatuses. In particular, the program including a method for controlling a display apparatus according to example embodiments may be stored in a non-transitory computer readable medium and provided therein.

The non-transitory computer readable medium refers to a medium that stores data semi-permanently rather than storing data for a very short time, such as a register, a cache, a memory or etc., and is readable by an apparatus. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing example embodiments and advantages are merely examples and are not to be construed as limiting the example embodiments. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. A display apparatus comprising:
a display;
a first sensor configured to sense an intensity of light incident in a first direction from an area in front of the display;
a second sensor configured to sense a color of light incident in a second direction different from the first direction of the light sensed by the first sensor and a distance between the second sensor and an installed surface where the display apparatus is installed, the second sensor being disposed at a lower part of the display apparatus; and
a processor configured to:
identify a color of the installed surface based on the color of the light sensed by the second sensor,
identify whether a type of installation of the display apparatus is a wall-mount type or a stand type based on the distance sensed by the second sensor,
identify a correction factor based on a light loss rate corresponding to the identified color of the installed surface and the identified type of installation of the display apparatus,
correct a value corresponding to the intensity of the light sensed by the first sensor based on the identified correction factor, and
control an operation of the display apparatus based on the corrected value.

2. The display apparatus as claimed in claim 1, wherein the processor is further configured to adjust a brightness of the display based on the corrected value.

3. The display apparatus as claimed in claim 1, wherein the first sensor is further configured to individually sense an infrared ray and a light of a predetermined color band, and
wherein the processor is further configured to determine a type of a light source in a peripheral area of the display apparatus based on a ratio of the sensed infrared ray to the sensed light of the predetermined color band.

4. The display apparatus as claimed in claim 3, wherein the processor is further configured to adjust a color temperature of an image according to the determined type of the light source.

5. The display apparatus as claimed in claim 1, wherein the first sensor is an illuminance sensor or a color sensor, and
wherein the second sensor is a color sensor, a charge-coupled device (CCD) sensor, or a complementary metal-oxide semiconductor (CMOS) sensor.

6. The display apparatus as claimed in claim 1, wherein the first sensor is provided at a rear surface of the display, and
wherein the display apparatus further comprises a reflection member disposed outside of the display and configured to reflect a light incident from the area in front of the display and image the reflected light on the first sensor.

7. The display apparatus as claimed in claim 6, wherein the second sensor is provided adjacent to the first sensor at the rear surface of the display.

8. The display apparatus as claimed in claim 6, wherein the reflection member is a waveguide in which a cross-section of one end of a pipe is positioned on the first sensor and another end of the pipe is disposed toward a front of the display.

9. A displaying method comprising:
- identifying, by a first sensor, an intensity of light incident in a first direction from an area in front of a display;
- identifying, by a second sensor, a color of light incident in a second direction different from the first direction of the light identified by the first sensor and a distance between the second sensor and an installed surface where a display apparatus is installed, the second sensor being disposed at a lower part of the display apparatus;
- identifying a color of the installed surface based on the color of the light sensed by the second sensor,
- identifying whether a type of installation of the display apparatus is a wall-mount type or a stand type based on the distance sensed by the second sensor,
- identifying a correction factor based on a light loss rate corresponding to the identified color of the installed surface and the identified type of installation of the display apparatus;
- correcting a value corresponding to the detected intensity of the light based on the identified correction factor; and
- displaying an image based on the corrected value.

10. The displaying method as claimed in claim 9, wherein the displaying the image comprises displaying the image by adjusting a brightness of the display based on the corrected value.

11. The displaying method as claimed in claim 9, wherein the detecting identifying the intensity of the light comprises individually detecting an infrared ray and a light of a predetermined color band, and
- wherein the displaying method further comprises determining a type of a light source in a peripheral area of the display based on a ratio of the detected infrared ray to the detected light of the predetermined color band.

12. The displaying method as claimed in claim 11, wherein the displaying the image comprises displaying the image by adjusting a color temperature of the image according to the determined type of the light source.

13. The displaying method as claimed in claim 9,
- wherein the displaying method further comprises reflecting, by a reflection member disposed outside of the display, the light incident in the first direction from the area in front of the display to the first sensor.

14. A display apparatus comprising:
- a display;
- a first sensor configured to sense an intensity of light incident from an area in front of a display surface of the display apparatus;
- a second sensor mounted on a rear surface of the display apparatus opposite to the display surface and configured to sense a color of light incident from an installed surface on which the display apparatus is installed below a bottom surface of the display apparatus and a distance between the second sensor and the installed surface; and
- a processor configured to:
- identify a color of the installed surface based on the color of the light sensed by the second sensor,
- identify whether a type of installation of the display apparatus is a wall-mount type or a stand type based on the distance sensed by the second sensor,
- identify a correction factor based on a light loss rate corresponding to the identified color of the installed surface and the identified type of installation of the display apparatus,
- correct a value corresponding to the intensity of the light based on the identified correction factor, and
- change a display property of the display based on the corrected value.

15. The display apparatus as claimed in claim 14, wherein the display property of the display is a brightness of the display, and
- wherein the display apparatus further comprises a reflection member disposed outside of the display and configured to reflect the light incident in a first direction from the area in front of the display surface of the display to the first sensor.

* * * * *